Patented Mar. 8, 1932

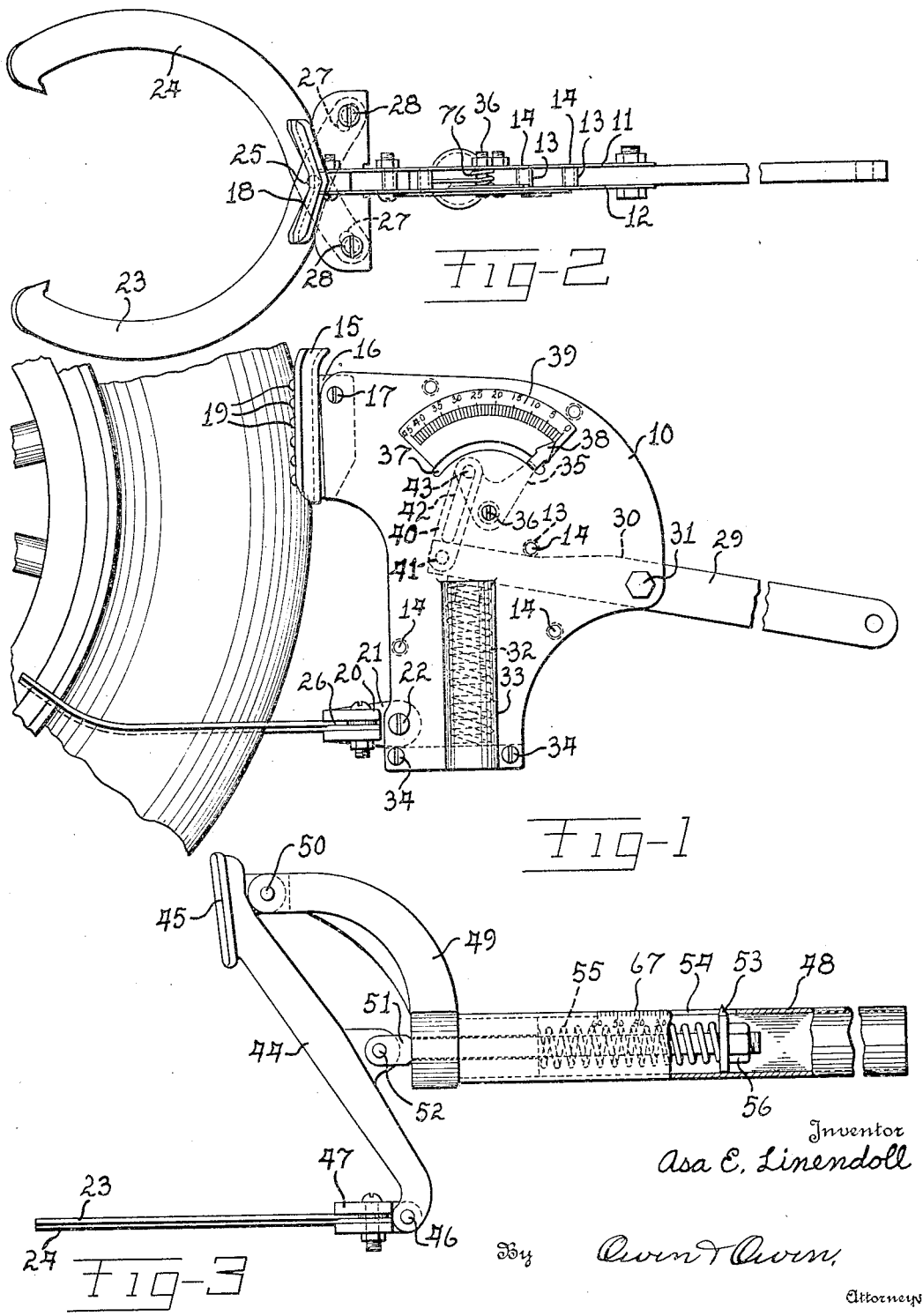

1,848,487

UNITED STATES PATENT OFFICE

ASA E. LINENDOLL, OF NORWALK, OHIO

BRAKE TESTING DEVICE

Application filed September 21, 1927. Serial No. 220,905.

This invention relates to devices for testing brakes, and more particularly for ascertaining the relative force of brakes on different wheels of automobiles.

The invention comprises a device for holding the brake pedal in fixed position and for applying torque to a wheel and measuring the torque applied. By this means it is possible to ascertain the relative torque necessary to turn the different wheels without changing the position of the brake pedal.

As is well known, it is desirable to have the braking action on the two rear wheels substantially equal. Where four wheel brakes are used it is desirable also to have the braking action on the two front wheels equal, and certainly less than the braking action on the rear wheels. My device measures the relative torque necessary to turn the several wheels with the pedal in any desired position, so that the brakes may be adjusted to give the relative braking action desired on the several wheels.

Details of the invention will appear as the description proceeds.

Figure 4:
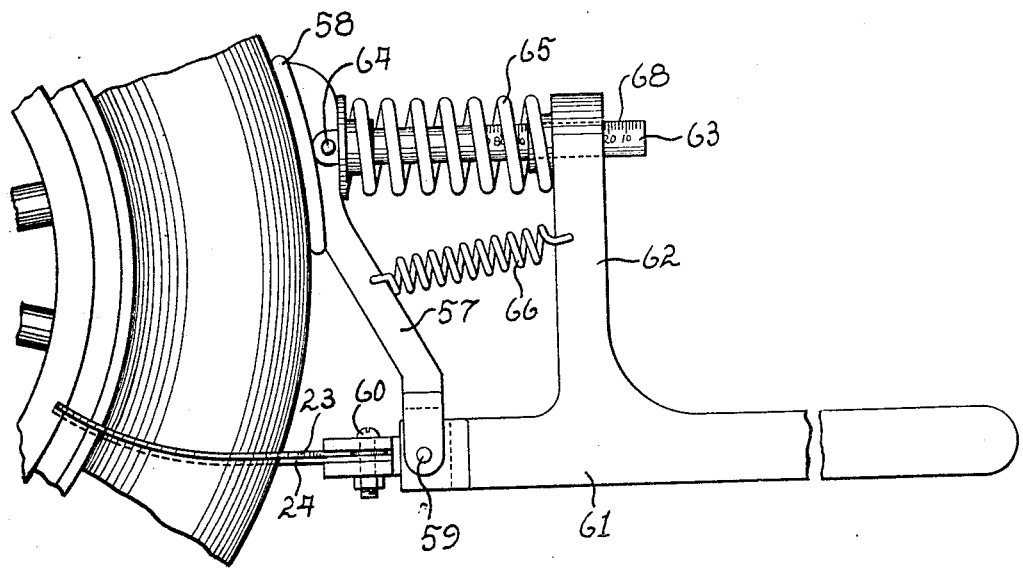
Figure 5:
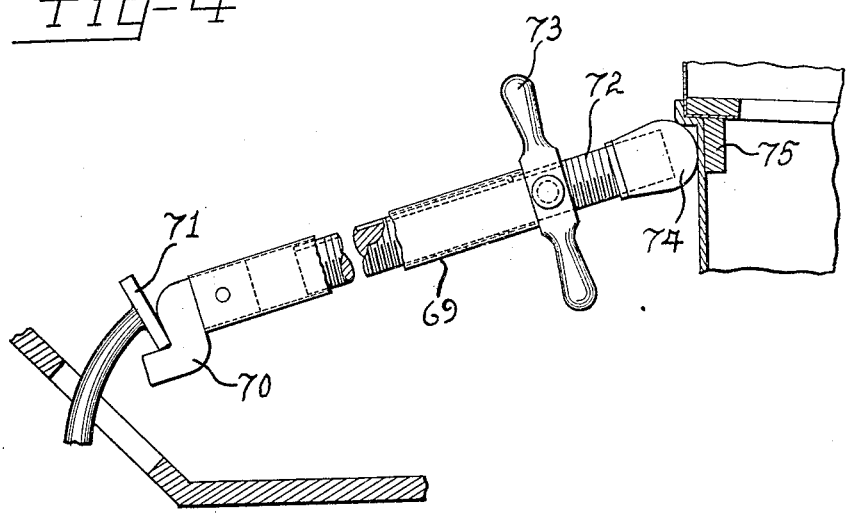

Referring to the accompanying drawings forming a part of this specification, Figure 1 is a side elevation of the preferred form of torque-applying means with a portion of a wheel to which the device is applied; Fig. 2 is a plan view of the torque-applying device shown in Fig. 1; Figs. 3 and 4 are side elevations of modifications of the torque-applying device; Fig. 5 is a side elevation of means for holding a brake pedal is position, shown somewhat diagrammatically applied to a pedal.

The preferred form of torque-applying device comprises a main body member 10 made up of two sheets of metal 11 and 12 spaced apart in parallel relation by any suitable means. In the form disclosed there are a plurality of cylindrical spacing members 13 having reduced ends 14 entering suitable holes in the respective plates.

An abutment member 15 has a web 16 entering between the upper parts of plates 11 and 12, and preferably pivoted upon a bolt 17 passing through the plates. The abutment member has a preferably concave or wedging face 18 adapted to contact the thread of the tire, and may be provided with ridges 19 to provide a better grip upon the tire.

Beneath member 15 there is an attachment-carrying member 20 having a web 21 entering between the lower parts of plates 11 and 12, and preferably pivoted upon a bolt 22 passing through the plates. Means for gripping the rim of the wheel are mounted on member 20. In the construction shown, this means comprises a pair of tong members 23 and 24 pivoted together at 25 and having their rear ends entering a slot 26 in member 20. The rear ends of the tong members are slotted as shown in dotted lines at 27 on Fig. 2, and bolts 28 pass through member 20 and slots 27.

A lever 29 has one end 30 extending in between plates 11 and 12, and is fulcrumed on a bolt 31 passing through plates 11 and 12. The end 30 of lever 29 normally rests upon a spring 32 mounted within a housing 33 formed by suitable conformation of plates 11 and 12. In addition to fulcrum bolts 17, 22, 31, there may be provided additional bolts, such as shown at 34, for holding the two plates together. One of the bodies 13 may be suitably positioned to act as a stop for the end 30 of lever 29 when the apparatus is in its normal position.

Above spring 32 there is an indicating member 35 pivoted at 36 between the plates. Member 35 is substantially V-shaped and one arm is extended outward through a slot 37 in plate 12 and has its end shaped to form a pointer 38 co-operating with a suitable scale 39 positioned on the side of the plate. A link 40 is pivoted at 41 to the end 30 of lever 29 and has a slot 42 in its other end which works over a pin 43 on the other arm of member 35 from pointer 38.

In the form of device shown in Fig. 3 there is a member 44 having a tire-abutting plate 45 at its upper end and having a pivot 46 at its lower end, upon which pivot there is an attachment-carrying device 47 similar to device 20. The tong members 23 and 24 are the same in this construction as in that previously described.

A cylindrical handle 48 carries at one end a fixed bracket 49 pivoted at 50 to the upper end of member 44. A plunger rod 51 is pivoted at 52 near the middle of member 44. Plunger member 51 extends into the hollow of handle 48 and carries an indicating finger 53 extending out through a slot 54 in the wall of the handle. A spring 55 about plunger 51 normally moves the plunger into the handle. A nut 56 on the end of plunger 51 holds pointer member 53 against the end of the spring.

The device shown in Fig. 4 comprises a member 57 carrying a tire-abutting plate 58 at one end and having a pivot 59 at the other end upon which there may be pivoted a member 60 carrying tongs 23 and 24 similar to those described above.

A handle 61 is also mounted at one end upon pivot 59 and has an upwardly extending arm 62 perforated to receive an indicating bolt 63 pivoted at 64 to the upper end of member 57. A spring 65 resists the movement of arm 62 towards plate 58, and a spring 66 connected to members 57 and 62 prevents the unintentional movement apart of members 57 and 62 to such an extent as to withdraw member 63 from the perforation in member 62.

In the form shown in Fig. 3 there are indicating marks 67 at the sides of slot 54, and in the form shown in Fig. 4 there are indicating marks 68 upon members 63.

The brake holding device shown in Fig. 5 comprises a cylindrical member 69 to one end of which there is fastened a foot 70 adapted to fit upon a brake pedal 71. A threaded member 72 telescopes within member 69 to as great an extent as is permitted by a handwheel 73. The outer end of threaded member 72 carries an abutment block 74, of rubber or similar material, adapted to contact the seat 75 of the automobile.

The operation of the device is fairly apparent from the description of the construction thereof, but for convenience may be briefly summarized as follows:

When the brakes of a car are to be tested and adjusted, the brake pedal is first depressed. The pedal may be depressed to any degree at which it is desired to test the brakes, but inasmuch as even application of the brakes is more essential when the pedal is pressed down to secure approximately maximum braking effect, it is preferable to press the pedal to approximately this extent when preparing to test and adjust the brakes. Member 70 is then placed upon the pedal and handwheel 73 adjusted until head 74 bears against the seat and holds foot 70 in place against the pedal so that the pedal is held depressed to the desired extent.

Thereafter the wheels may be raised, either simultaneously or successively, and tested by the torque-applying device. If adjustment of the brakes is found necessary, the pedal depressor may be removed to release the brake band for ease in adjustment. Preferably, the pedal depressor is removed without changing the adjustment of hand wheel 73, so it may be replaced and depress the pedal exactly as before. In this way the successive tests of brakes are strictly comparable regardless of how many times the pedal is released for purposes of adjusting the brake.

In using the device shown in Fig. 1, member 15 is applied to the tread of the tire, tongs 23 and 24 are positioned to grip the rim of the wheel immediately beneath the point of application of member 15 in the tread, and then force is applied to lever 29 sufficient to overcome the resistance of the brake and turn the wheel. It will be readily understood that, as force is applied to lever 29, end 30 compresses spring 32 and link 40 pulls downward on pin 43 and so moves pointer 38 along the scale 39 to the left as shown in Fig. 1. After the brake yields and the wheel turns, the lever is released, allowing the spring to move end 30 back to its normal position. However, there is preferably a degree of friction applied to member 35 sufficient to hold the pointer 38 in the position to which it has been moved. Slot 42 allows the upward movement of end 30 without movement of pin 43. In order to insure sufficient friction to hold the pointer 38 in the position to which it is moved during the application of force to lever 29, member 35 may be pressed against plate 12 by means of a spring 76 mounted around pivot 36.

The position of the pointer will then indicate the amount which spring 32 has been depressed before the brake, as applied to that particular wheel, yields and allows the turning of the wheel.

Thereafter the pointer is returned to its original position, and another wheel tested in like manner. The readings of the two positions of the pointer give the relative resistance of the brakes as applied to the wheels, as will be readily understood.

It will be noted that the pivoting of member 15 insures that the pressure of plates 11 and 12 always comes at pivot 17, whereas the resistance of the tire might be at a point above or below that pivot if member 15 were fixed to the body member of the device, with a resulting variation in leverage and inaccuracy in the indication of torque applied.

It will be further noted that the tongs grip the edges of the steel rim and are thus automatically positioned a fixed distance from the radius of the wheel, and the tong members being rigid and of equal length automatically position the device, including the lifting lever, radially of the wheel, so that the lifting torque is applied in the plane of the wheel and not at an angle thereto.

It is frequently desirable to turn the wheel through a longer arc than it is possible to move the lever through without changing its attachment to the wheel. With the device shown, the wheel may be turned by lifting the lever as far as may be done without interference with adjacent parts of the vehicle and then the lever may be lowered, the tongs automatically opening sufficiently to slide down the rim and grip it at a lower point for the next turning movement when the lever is again raised. In this way a wheel may be turned completely around one or more times without other manipulation than the simple raising and lowering of the end of the lever.

The device for allowing the pointer to remain in the position to which it is moved when the maximum torque is applied is a convenience, as it enables the amount of torque to be read after the turning has been completed. Where such provision is not made it is difficult to ascertain accurately the maximum torque applied, as the pointer remains only instantaneously in that position.

It will be obvious that the forms shown in Figs. 3 and 4 have some of the advantages described above, particularly as regards the application of the torque in the plane of the wheel, and not at an angle thereto. Other modifications of the apparatus may be made within the terms of the appended claims.

What I claim is:

1. In a brake testing device, a main body member, a tire tread abutting member pivoted to the main body member, means for attaching the main body member to a portion of the body of the wheel adjacent the point where said abutment member abuts the tread of a tire, means for exerting a turning torque upon the main body member to exert torque on the wheel, and means to measure the torque thus applied.

2. In a device for testing brakes, an abutment member adapted to abut the tread of a tire, gripping devices adapted to grip the rim of the wheel adjacent the point where said abutment member abuts the tread of the tire, means for applying tension to said gripping device and pressure to the abutment member to exert torque on the wheel, and means for measuring the torque thus applied.

3. In a device for testing brakes, an abutment member adapted to abut the tread of a tire, tongs adapted to grip the rim of the wheel adjacent the point where said abutment member abuts the tread of the tire, means for applying tension to said gripping device and pressure to the abutment member to exert torque on the wheel, and means for measuring the torque thus applied.

4. A device for testing brakes comprising an abutment member for abutting the tread of a wheel and a gripping device for gripping a portion of the body of the wheel adjacent the point where the abutment member abuts the tire thereof, said gripping device comprising tongs consisting of two equal members pivoted together and having their rear ends slotted, pins passing through the slots, means for moving the pins to exert tension upon the tongs and pressure upon said abutment member and thereby exert torque on the wheel, means for measuring the torque thus applied and means for indicating the maximum amount of torque thus measured.

5. A brake tester for testing separately the action of the brakes upon the wheels of an automobile while the brakes are applied by an unvarying force upon the wheels so that the brake action upon the separate wheels may be measured and equalized, comprising in combination means for applying torque to a wheel, means for attaching the torque-applying means to the wheel, and means for measuring the torque thus applied, the attaching means comprising a pair of tongs adapted to straddle the tire of a wheel, and connections between the tongs and the torque-applying means for applying closing force upon the tongs when torque is applied to the wheel.

6. A brake tester for testing separately the action of the brakes upon the wheels of an automobile while the brakes are applied by an unvarying force upon the wheels so that the brake action upon the separate wheels may be measured and equalized, comprising in combination means for applying torque to a wheel, means for attaching the torque applying means to the wheel, and means for measuring the torque thus applied, the attaching means comprising a pair of tongs adapted to straddle the tire of a wheel and engage a rigid portion of the wheel inside of the tire, and connections between the tongs and the torque-applying means for applying closing force upon the tongs when torque is applied to the wheel.

7. A device for turning a braked wheel, comprising means for gripping the rim of the wheel, a lever pivoted to said means and adapted to apply turning force to the wheel through the means and means intermediate the lever and first named means for measuring the force applied to the lever, the lever being substantially radial of the wheel when the wheel-moving force is applied thereto.

In testimony whereof I have hereunto signed my name to this specification.

ASA E. LINENDOLL.